United States Patent
Schillinger et al.

(10) Patent No.: US 11,614,124 B2
(45) Date of Patent: Mar. 28, 2023

(54) ASSEMBLY FOR CONNECTING AN ADAPTER SHAFT TO A SHAFT IN A FORCE-FITTING MANNER USING A CLAMPING RING

(71) Applicant: SEW-EURODRIVE GMBH & CO. KG, Bruchsal (DE)

(72) Inventors: Jens Schillinger, Rastatt (DE); Sascha Haller, Karlsruhe (DE); Markus Wöppermann, Karlsbad (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 116 days.

(21) Appl. No.: 16/645,783

(22) PCT Filed: Aug. 21, 2018

(86) PCT No.: PCT/EP2018/025219
§ 371 (c)(1),
(2) Date: Mar. 9, 2020

(87) PCT Pub. No.: WO2019/048081
PCT Pub. Date: Mar. 14, 2019

(65) Prior Publication Data
US 2020/0271163 A1    Aug. 27, 2020

(30) Foreign Application Priority Data
Sep. 8, 2017   (DE) ................... 10 2017 008 435.1

(51) Int. Cl.
*F16D 1/04* (2006.01)
*F16D 1/08* (2006.01)

(52) U.S. Cl.
CPC ............. *F16D 1/04* (2013.01); *F16D 1/0847* (2013.01)

(58) Field of Classification Search
CPC .......... F16B 7/042; F16B 7/182; F16B 21/10; F16B 21/12; F16B 21/14; F16B 21/18;
(Continued)

(56) References Cited

U.S. PATENT DOCUMENTS 2,221,371 A    11/1940  Stevens
2,437,305 A    3/1948   Nickle
(Continued)

FOREIGN PATENT DOCUMENTS

CN    2797742 Y    7/2006
CN    103851092 A    6/2014
(Continued)

*Primary Examiner* — Josh Skroupa
*Assistant Examiner* — Zachary A Hall
(74) *Attorney, Agent, or Firm* — Carter, DeLuca & Farrell LLP

(57) ABSTRACT

In an assembly for connecting an adapter shaft to a shaft in a force-fitting manner using a clamping ring, the clamping ring is mounted on the adapter shaft, the shaft is inserted into the adapter shaft, the clamping ring has a radially uninterrupted threaded bore, into which a screw part is screwed, in particular a threaded pin, which exerts pressure on the adapter shaft. A cylinder bolt is accommodated in a first, in particular radially directed, recess of the clamping ring, which projects radially inward into a second, in particular radially directed, recess introduced into the adapter shaft, in particular projects into it, especially in order to form a protection against loss and an anti-rotation protection acting in the axial direction and in the circumferential direction.

24 Claims, 17 Drawing Sheets

(58) Field of Classification Search
CPC ........ F16B 21/183; F16B 21/186; F16B 3/00;
F16B 2/065; F16B 2200/509; F16B
7/0406; F16B 7/0413–042; F16D 1/04;
F16D 1/0829; F16D 1/0847; F16D
1/0852; F16D 1/0864; F16D 1/08; F16D
1/0876; F16D 1/108; F16D 1/116; Y10T
403/589; Y10T 403/7041; Y10T 403/7067

See application file for complete search history.

(56) References Cited

U.S. PATENT DOCUMENTS

| | | | | |
|---|---|---|---|---|
| 3,507,508 | A * | 4/1970 | Andrews | B23B 31/1075 |
| | | | | 279/83 |
| 3,680,404 | A * | 8/1972 | Firth | F16H 55/566 |
| | | | | 474/33 |
| 4,252,458 | A * | 2/1981 | Keen | F16B 7/0406 |
| | | | | 403/287 |
| 4,479,669 | A * | 10/1984 | Hynes | E21B 17/046 |
| | | | | 285/332.3 |
| 5,374,135 | A * | 12/1994 | Folsom | F16B 29/00 |
| | | | | 279/53 |
| 9,200,677 | B2 | 12/2015 | Shinichi et al. | |
| 9,382,948 | B1 * | 7/2016 | Drum | F16C 35/063 |
| 9,587,672 | B1 * | 3/2017 | Rockefeller | F16C 17/03 |
| 9,822,818 | B1 * | 11/2017 | Hewitt | F16C 35/063 |
| 2004/0165802 | A1 * | 8/2004 | Schill | F16D 1/0864 |
| | | | | 384/541 |
| 2006/0291764 | A1 * | 12/2006 | Ravindra | F16D 1/0847 |
| | | | | 384/541 |
| 2007/0098314 | A1 | 5/2007 | Lenick et al. | |
| 2014/0154005 | A1 * | 6/2014 | Nishibe | F16D 1/04 |
| | | | | 403/356 |
| 2022/0257015 | A1 * | 8/2022 | Sisto | E21B 17/046 |
| | | | | 285/332.3 |

FOREIGN PATENT DOCUMENTS

| | | | |
|---|---|---|---|
| CN | 203835994 U | 9/2014 | |
| CN | 105121881 A | 12/2015 | |
| DE | 102004011361 B3 * | 7/2005 | ........... F16D 1/0864 |
| DE | 102006003445 A1 * | 8/2007 | ............. F16B 7/042 |
| DE | 102011013887 A1 | 9/2012 | |
| DE | 102013018551 A1 | 6/2014 | |
| DE | 102013113639 B3 * | 10/2014 | ............... F16D 1/05 |
| DE | 102014113783 A1 * | 3/2016 | ............... F16D 1/04 |
| WO | WO-2014187540 A1 * | 11/2014 | ........... F16D 1/0847 |

* cited by examiner

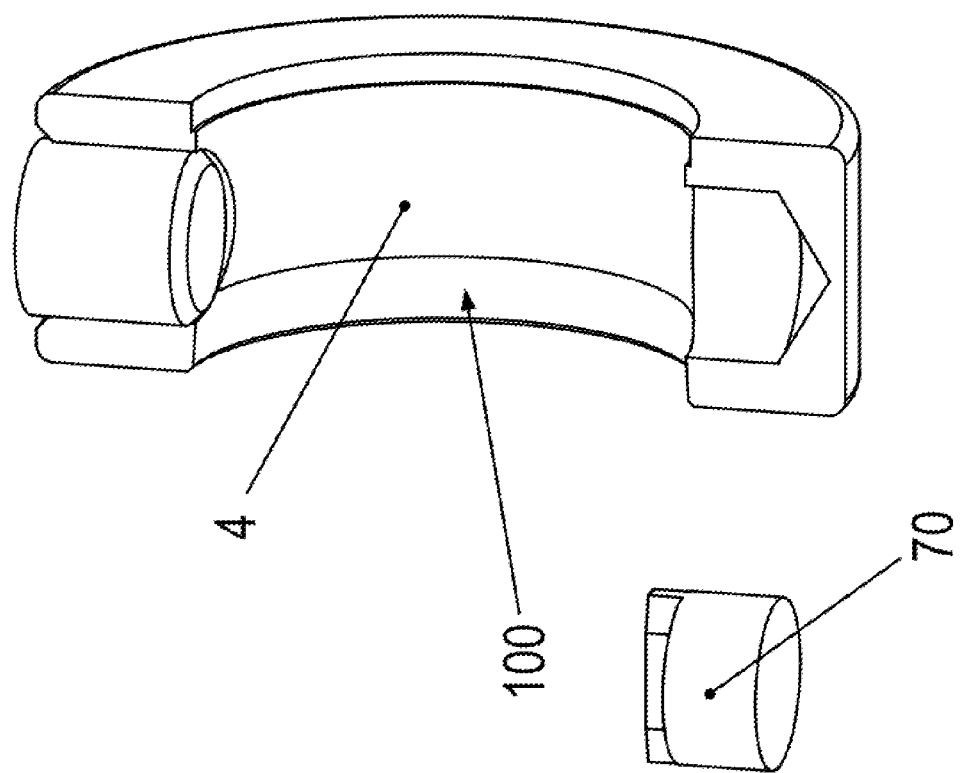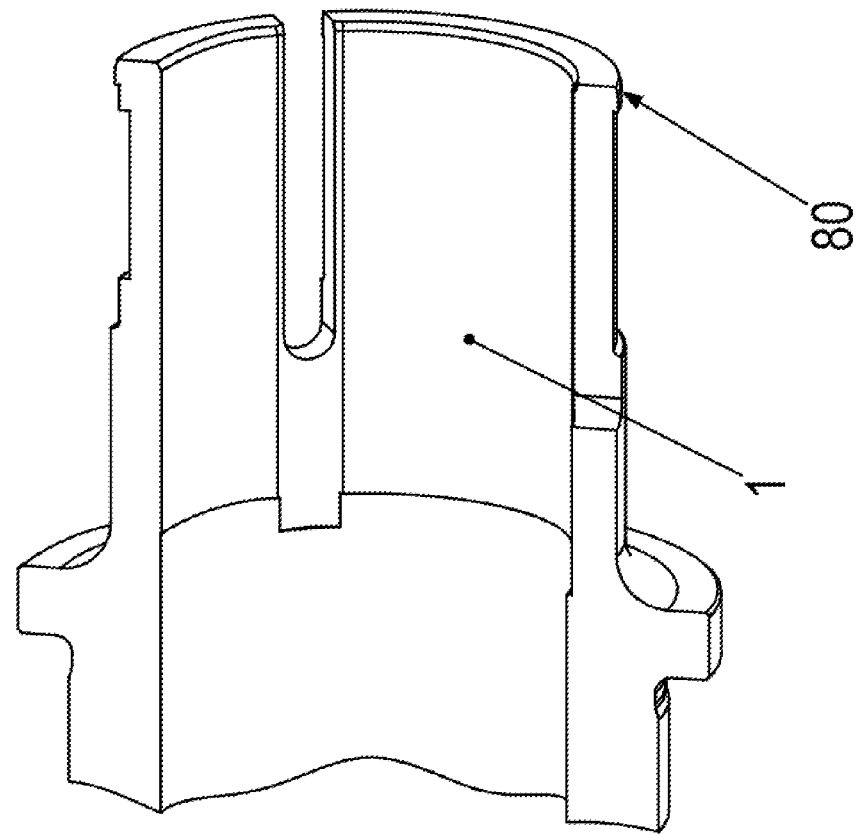
Fig. 10

ASSEMBLY FOR CONNECTING AN ADAPTER SHAFT TO A SHAFT IN A FORCE-FITTING MANNER USING A CLAMPING RING

FIELD OF THE INVENTION

The present invention relates to an assembly for connecting an adapter shaft to a shaft in a force-fitting manner using a clamping ring.

BACKGROUND INFORMATION

U.S. Pat. No. 2,221,371 describes a connection of an adapter shaft to a shaft with the aid of a clamping ring.

SUMMARY

Example embodiments of the present invention provide a force-fitting connection between a shaft and an adapter shaft.

According to an example embodiment of the present invention, in an assembly for connecting an adapter shaft to a shaft in a force-fitting manner with the aid of a clamping ring, the clamping ring is mounted on the adapter shaft, the shaft is inserted into the adapter shaft, the clamping ring has a radially uninterrupted threaded bore into which a screw part is screwed, in particular a threaded pin, which exerts pressure on the adapter shaft, and a cylinder bolt is accommodated in a first recess of the clamping ring, which projects radially inward into a second recess introduced into the adapter shaft, in particular projects into it, especially in order to form a protection against loss and an anti-rotation protection acting in an axial direction and in a circumferential direction.

This offers the advantage that a protection against loss is formed, in particular both in an axial direction and in a circumferential direction. The arrangement hereof is readily obtainable requires no further special mechanisms except for the cylinder bolt, i.e. a part in the form of a disk. A recess has to be provided both on the adapter shaft and on the clamping ring so that the cylinder bolt is able to be accommodated in both recesses.

Because of the axial slots, the adapter shaft is elastically deflectable and thus is able to be pressed against the hollow shaft as soon as the threaded pin exerts pressure on the adapter shaft. The contracting, in particular the shrink-fitting, is brought about in the process. A threaded bore, which passes through the clamping ring, is provided for the threaded pin. The recesses, on the other hand, do not have an uninterrupted configuration, especially not on the adapter shaft and not on the clamping ring either.

The foregoing improves the security of a force-fitting connection between the shaft and the adapter shaft by using a clamping ring for the contracting, in particular the shrink-fitting, of the adapter shaft provided with a hollow shaft region, which is captively situated on the adapter shaft, in particular captively situated in the axial direction and in the circumferential direction.

In this context, shrink-fitting always means mechanically induced contracting rather than thermally induced contracting.

According to example embodiments, the adapter shaft has axial slots, in particular axial slots that are set apart from one another in the circumferential direction, in particular axial slots that are set apart from one another at regular intervals in the circumferential direction. This is considered advantageous insofar as the adapter shaft is deformable without applying much force and the deformation does not allow waves to form in the circumferential direction. This is so because without axial slots, there would be a risk that the adapter shaft does not form any circumferential radially directed, sinusoidal-type characteristics in the circumferential direction when the threaded pin is pressed against the adapter shaft, but that the adapter shaft rests against the solid shaft in the most uniform manner possible.

According to example embodiments, the second recess overlaps with one of the axial slots, in particular, the region axially covered by the second recess thus overlaps with the region axially covered by the axial slot, and/or the region covered by the second recess in the circumferential direction thus overlaps with the region covered by the axial slot in the circumferential direction. This offers the advantage that the cylinder bolt presses two regions of the adapter shaft against the solid shaft. In the process, a slight displacement or expansion of the regions in the circumferential direction or counter to the circumferential direction, i.e. in the direction of the slotted region, is made possible.

According to example embodiments, the cylinder bolt is arranged as a disk, in particular as a cylindrical disk. This has the advantage of allowing for an uncomplicated, cost-effective production.

According to example embodiments, the shaft is inserted into a region of the adapter shaft that is arranged as a hollow shaft region, and in particular is situated coaxially with the adapter shaft. This has the advantage that the shaft is able to be accommodated in the adapter shaft and in the process is centered with respect to the axis of rotation of the adapter shaft.

According to example embodiments, the axial slot or the axial slots at the axial end of the adapter shaft lead(s) into the ambient air. This has the advantage that the adapter shaft has great elasticity in the axial end region.

According to example embodiments, the first recess and the second recess are situated diametrically opposite each other, and their centers of gravity or center points thus have a distance of 180° in the circumferential direction. This has the advantage of providing a balanced assembly. It is particularly important in this context that the material volume removed for the first recess during the production equals the material volume removed for the second recess.

According to example embodiments, the adapter shaft has at its axial end region a chamfer, in particular a lead-in bevel, in particular between the second recess and the axial end of the adapter shaft, which leads to the second recess when the clamping ring is placed on the cylinder bolt. This has the advantage that the cylinder bolt is guided into the second recess when the clamping ring is placed on the adapter shaft, and once the cylinder bolt has been accommodated in the second recess, the adapter shaft, in particular the axial end region, expands radially outward.

According to example embodiments, in an axial region between the region axially covered by the second recess and the axial end of the adapter shaft, the adapter shaft has a radially smaller extension in the region covered by the second recess in the circumferential direction than in a diametrically opposite region, in particular any other diametrically opposite region, in particular in the circumferential direction. This has the advantage that the cylinder bolt is inserted into the second recess with little force and then is retained by the elastic expansion of the adapter shaft.

According to example embodiments, the maximum radial distance of the adapter shaft in an axial region between the region axially covered by the second recess and the axial end of the adapter shaft increases from the region covered by the second recess in the circumferential direction to the region covered by the first recess in the circumferential direction. This has the advantage that once again an introduction of the cylinder bolt into the second recess is possible with little force and form-fitting, additional axial retaining is achievable with the aid of the bead if the clamping ring has a corresponding recessed region at its outer edge.

According to example embodiments, the first recess has a rectangular configuration and/or is tangentially aligned. This has the advantage of allowing for an uncomplicated production as a tangential, planar flattened area.

According to example embodiments, the second recess has a rectangular configuration and/or in particular has a circular blind bore that does not extend through the adapter shaft.

This has the advantage that this, too, makes for an uncomplicated production.

According to example embodiments, the characteristic of the maximum radial distance of the adapter shaft in the axial direction has a local minimum in the axial region covered by the second recess. This has the advantage that an uncomplicated production is achievable by machining the adapter shaft.

According to example embodiments, the region axially covered by the first recess overlaps with the region axially covered by the second recess. This has the advantage that the two devices are arranged in a mutually corresponding manner so that the cylinder bolt thus is able to positioned so that it projects into both of them.

According to example embodiments, the region covered by the first recess in the circumferential direction overlaps with the region covered by the second recess in the circumferential direction. This has the advantage that the two devices are arranged in a mutually corresponding manner so that the cylinder bolt thus is able to be positioned so that it projects into both of them.

According to example embodiments, the adapter shaft has a chamfer, in particular a lead-in bevel, which covers a circumferential angular range in the circumferential direction that includes the circumferential angular range covered by the second recess, and—set apart from the chamfer in the circumferential direction—a bead is provided on the adapter shaft, which covers an axial region that includes the axial region covered by the chamfer, in particular, the region covered by the bead in the circumferential direction includes the region covered by the flattened area in the circumferential direction, in particular, the radial distance region covered by the chamfer is situated radially within the radial distance region covered by the bead or radially adjoins it in the radially inward direction. This has the advantage that a form-fitting retainment of the screw part is provided in the same axial region and also a lead-in bevel, i.e. a non-form-fitting receptacle for the cylinder bolt. In other words, two completely different functions are achieved in the same axial region.

Further features and aspects of example embodiments of the present invention are described in more detail below with reference to the appended Figures.

BRIEF DESCRIPTION OF THE DRAWINGS

FIGS. 7 to 17 are additional view of example embodiments of the present invention.

DETAILED DESCRIPTION

Figure 1:
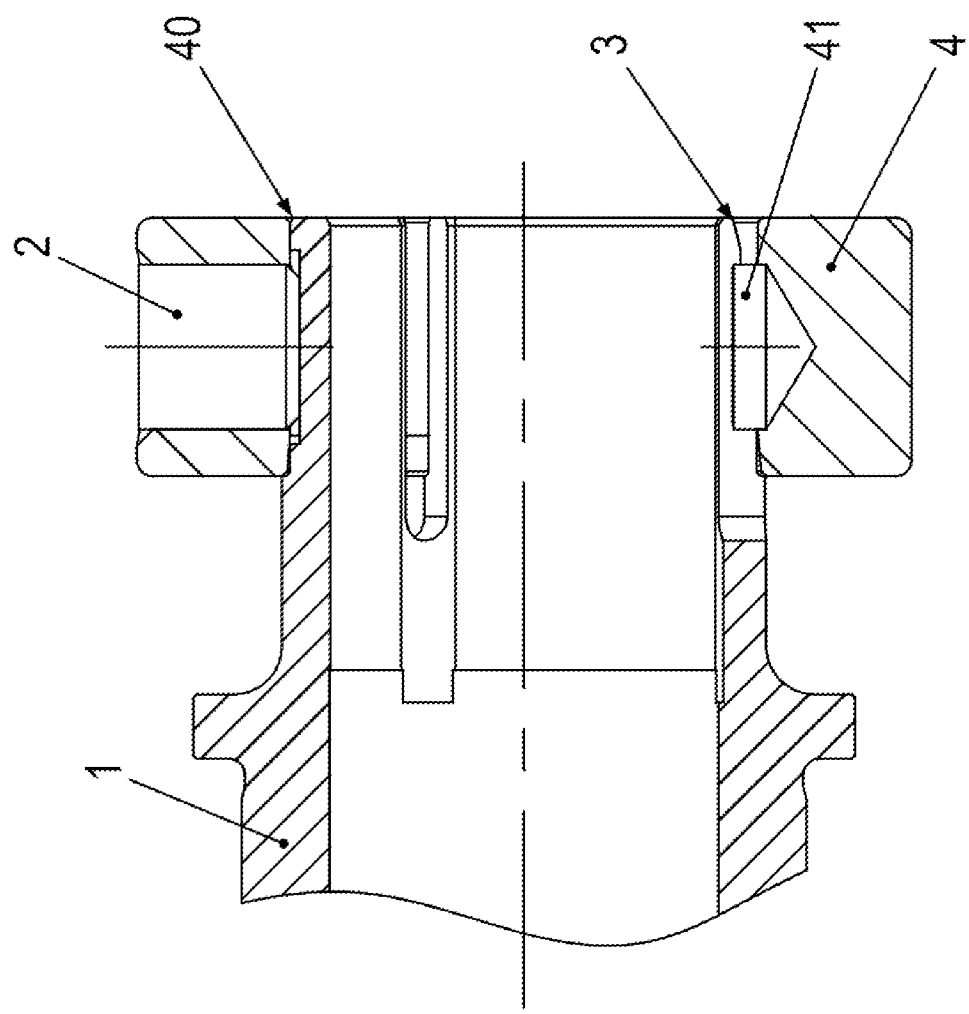
FIG. 1 is a longitudinal cross-sectional view though a clamping unit, which has an adapter shaft 1 provided with an inserted clamping ring 4.
Figure 2:
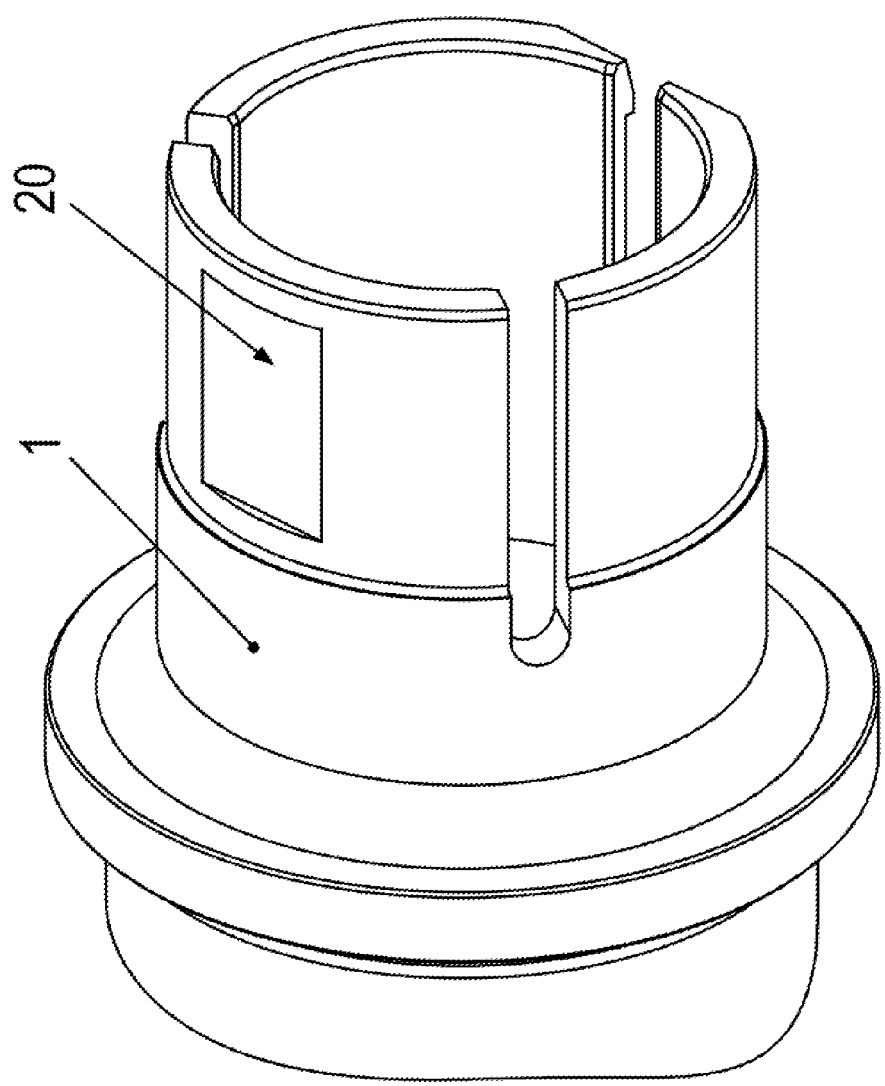
FIG. 2 is a perspective view of adapter shaft 1 from a first viewing direction.
Figure 3:
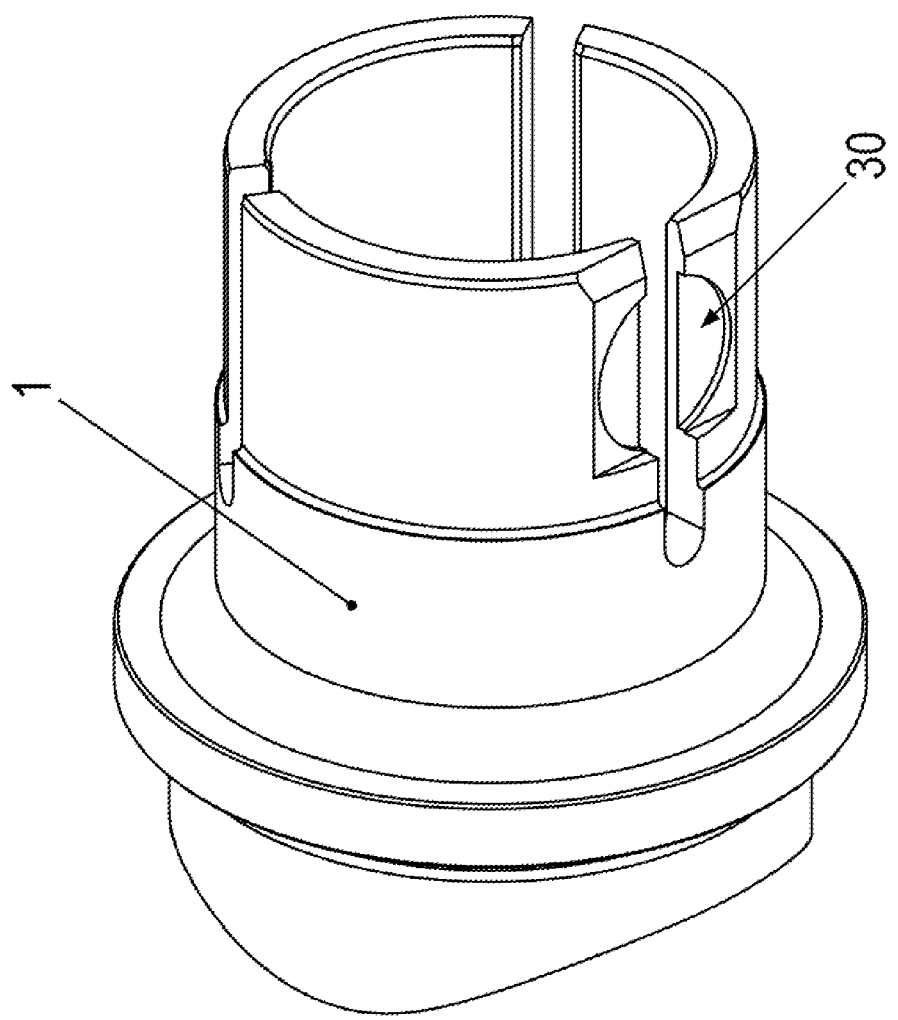
FIG. 3 is a perspective view of adapter shaft 1 from a different viewing direction.
Figure 4:
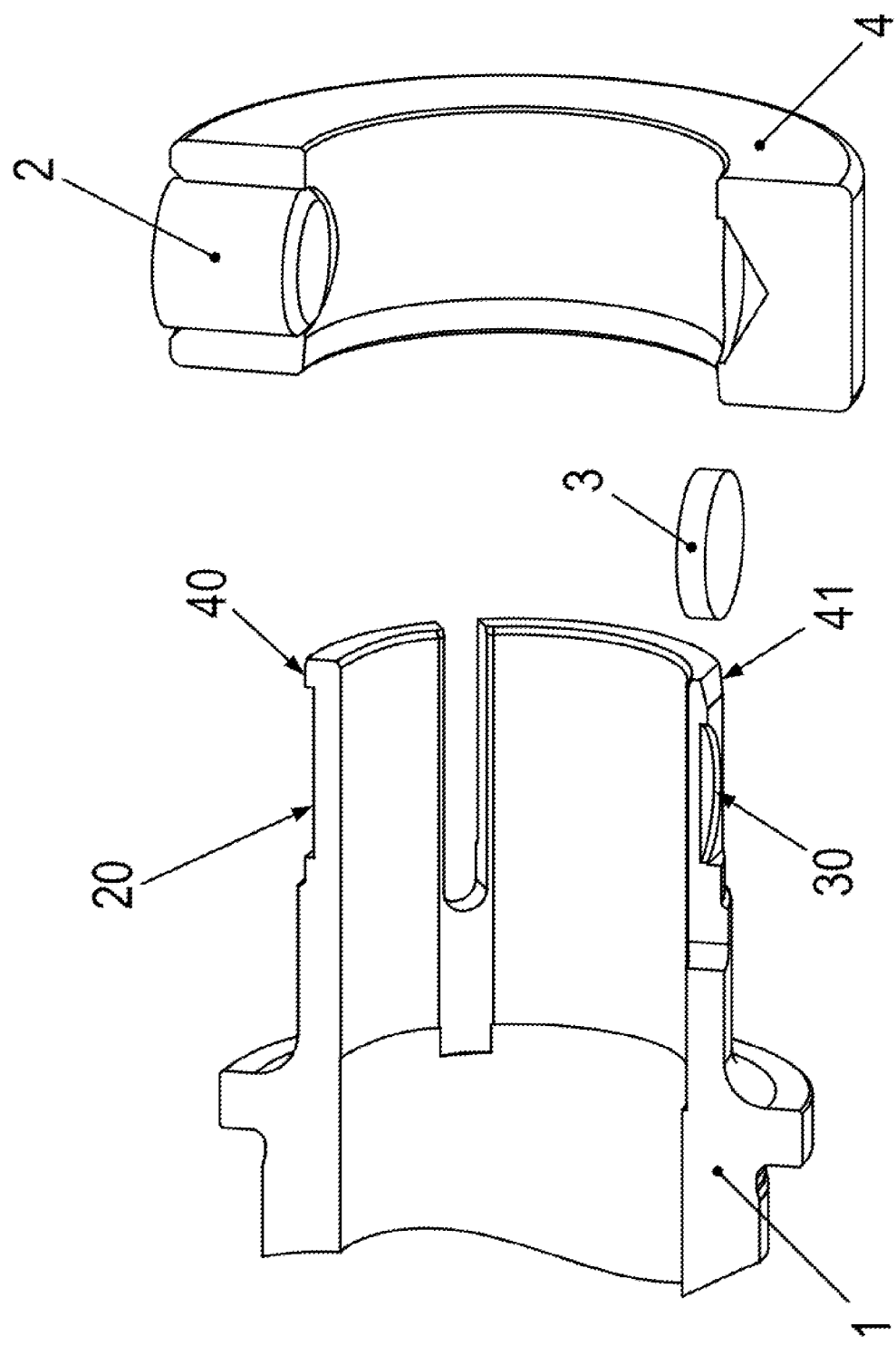
FIG. 4 is an exploded view of the clamping unit.

As illustrated in the Figures, adapter shaft 1 has a hollow shaft region provided with axially extending slots, i.e. axial slots. The axial slots are, for example, set apart from one another at regular intervals in the circumferential direction and extend from the axially outer first end region of adapter shaft 1 to an axial position that is situated outside the axial region covered by clamping ring 4. The number of slots is, for example, three.

A solid shaft is inserted into adapter shaft 1. As a result, this solid shaft is radially surrounded by adapter shaft 1.

A threaded pin 2 is screwed into a threaded bore that radially extends through clamping ring 4 and exerts pressure on a flattened area 20 disposed on adapter shaft 1.

Flattened area 20 is arranged on the outer side of adapter shaft 1 and is tangentially aligned with respect to the center axis or the axis of rotation of the adapter shaft.

In the axial region covered by flattened area 20, adapter shaft 1 has a cylindrical development at its outer circumference, with the exception of the axial slots and a further recess having base area 30.

Threaded pin 2 presses on flattened area 20.

As a result, it is possible to press adapter shaft 1 against the solid shaft by screwing threaded pin 2 into the threaded bore that extends through the clamping ring.

In particular, the radially oriented recess having base area 30 may be situated diametrically opposite flattened area 20 and is used as a contact-pressure area for a cylinder bolt 3, which is arranged in an, in particular, radially directed recess at the inner circumference of clamping ring 4. Cylinder bolt 3 engages in the recess and is retained by another recess in the clamping ring.

This creates a protection against loss in the axial direction and in the circumferential direction.

Figure 5:
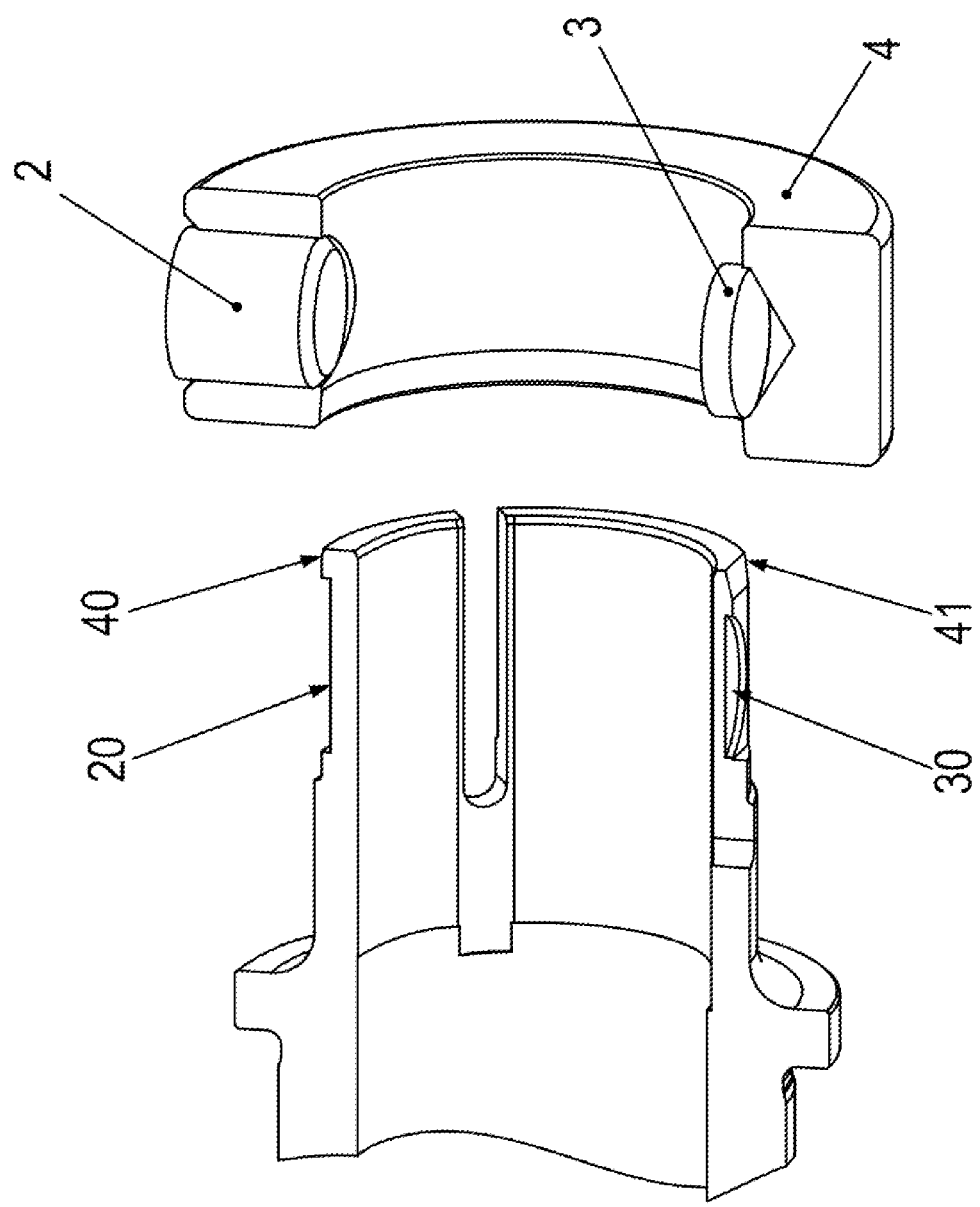
FIG. 5 shows the clamping unit before adapter shaft 1 is inserted into the clamping ring.
Figure 6:
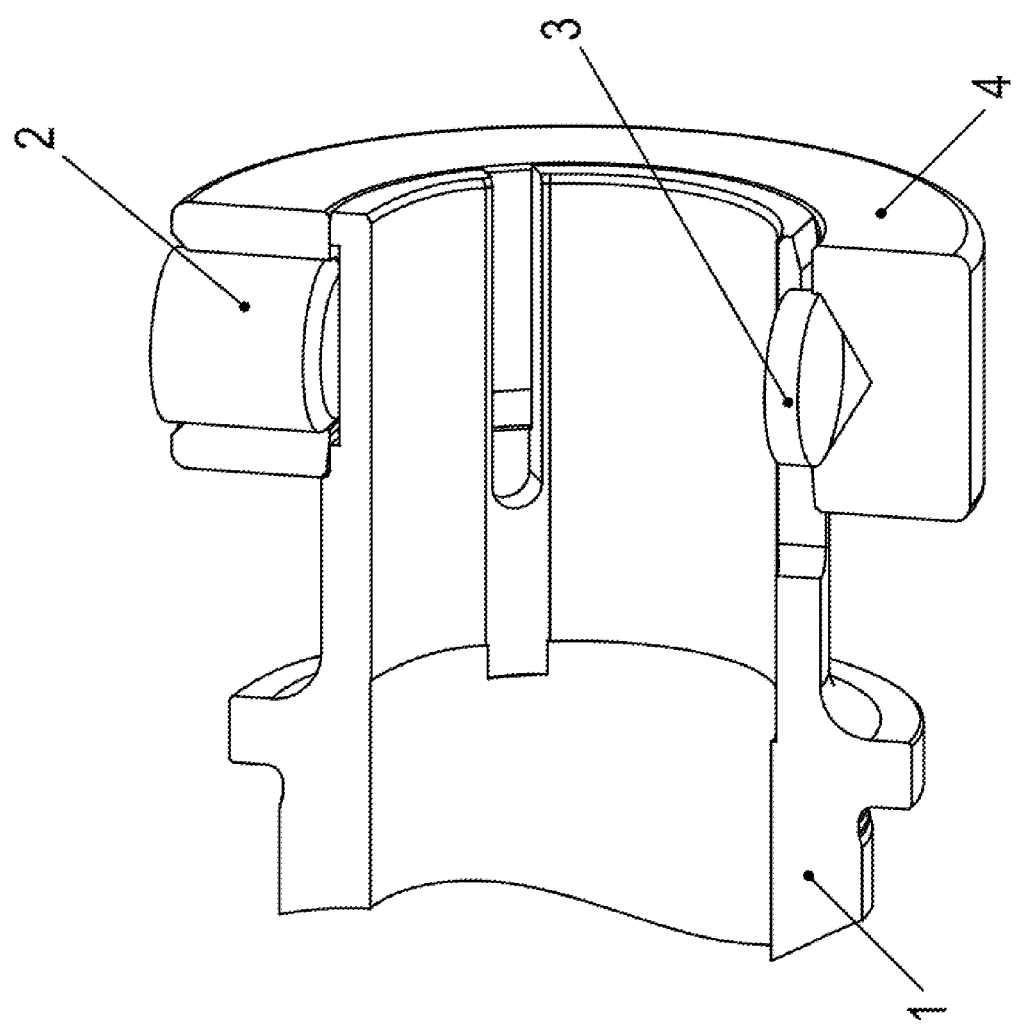
FIG. 6 is a partial cross-sectional view of the clamping unit.
Figure 7:
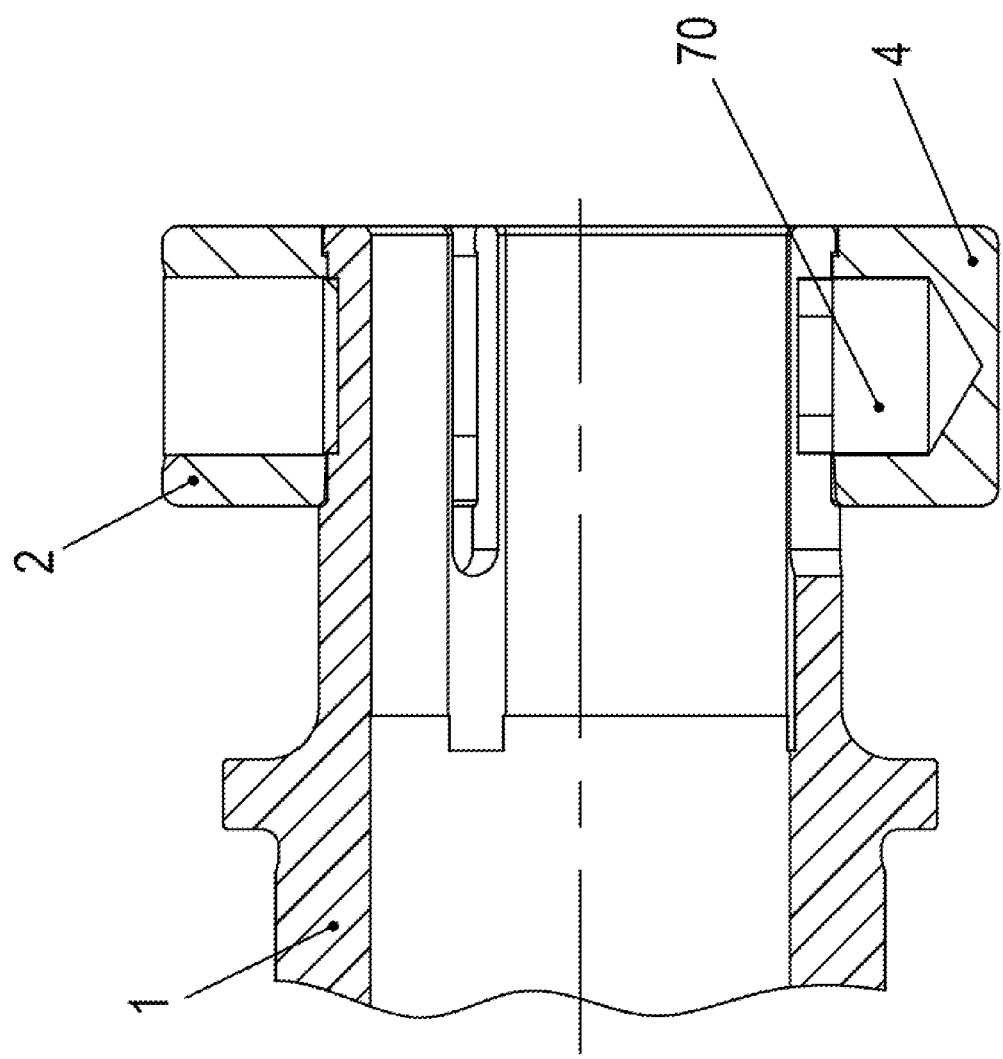
Figure 8:
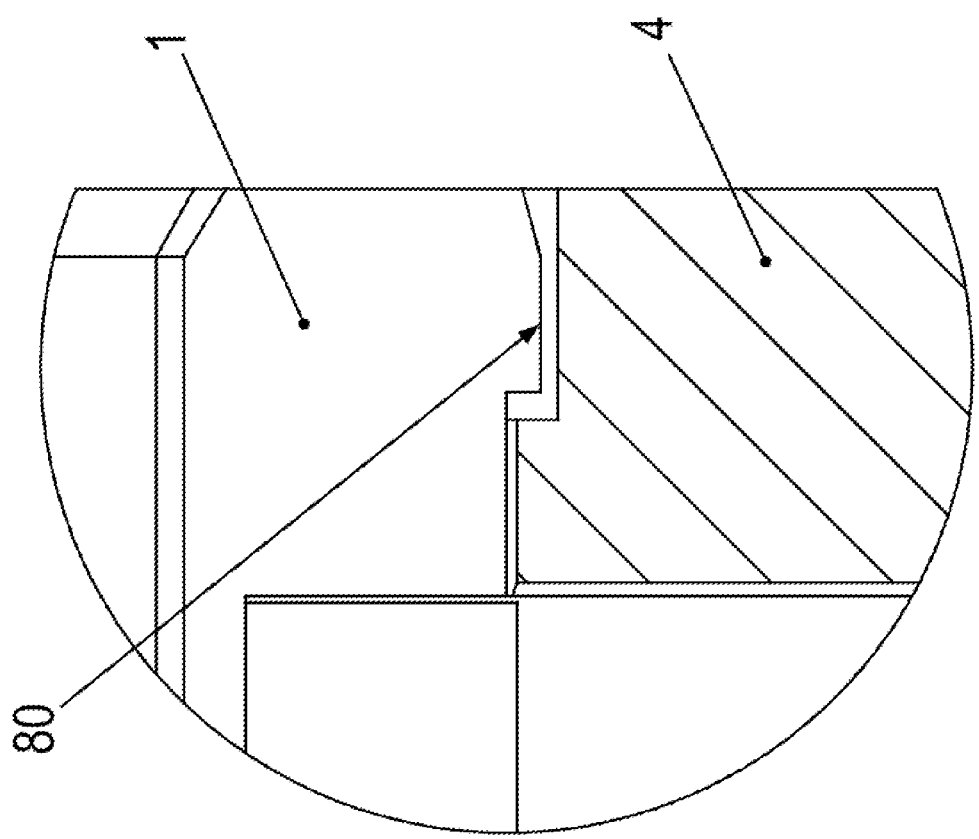
Figure 9:
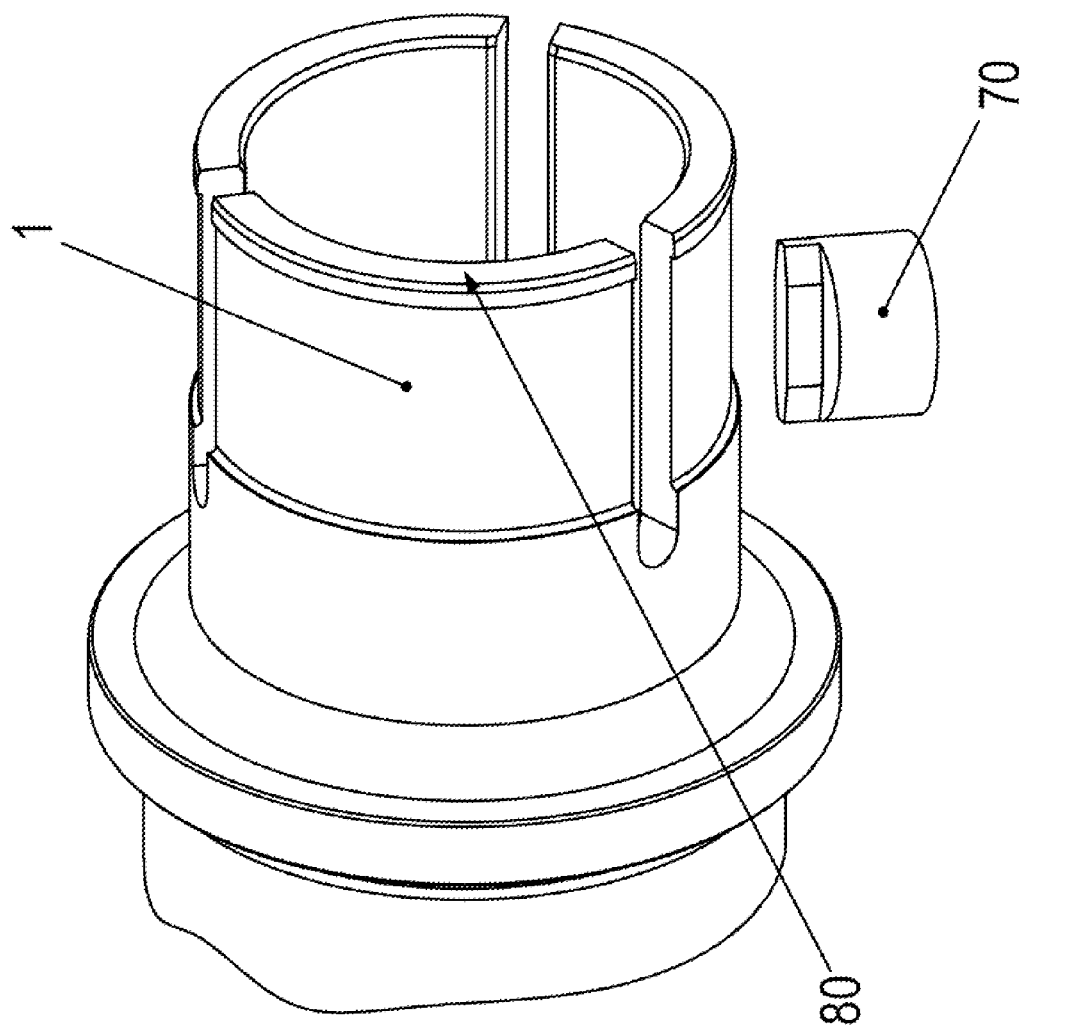
Figure 11:
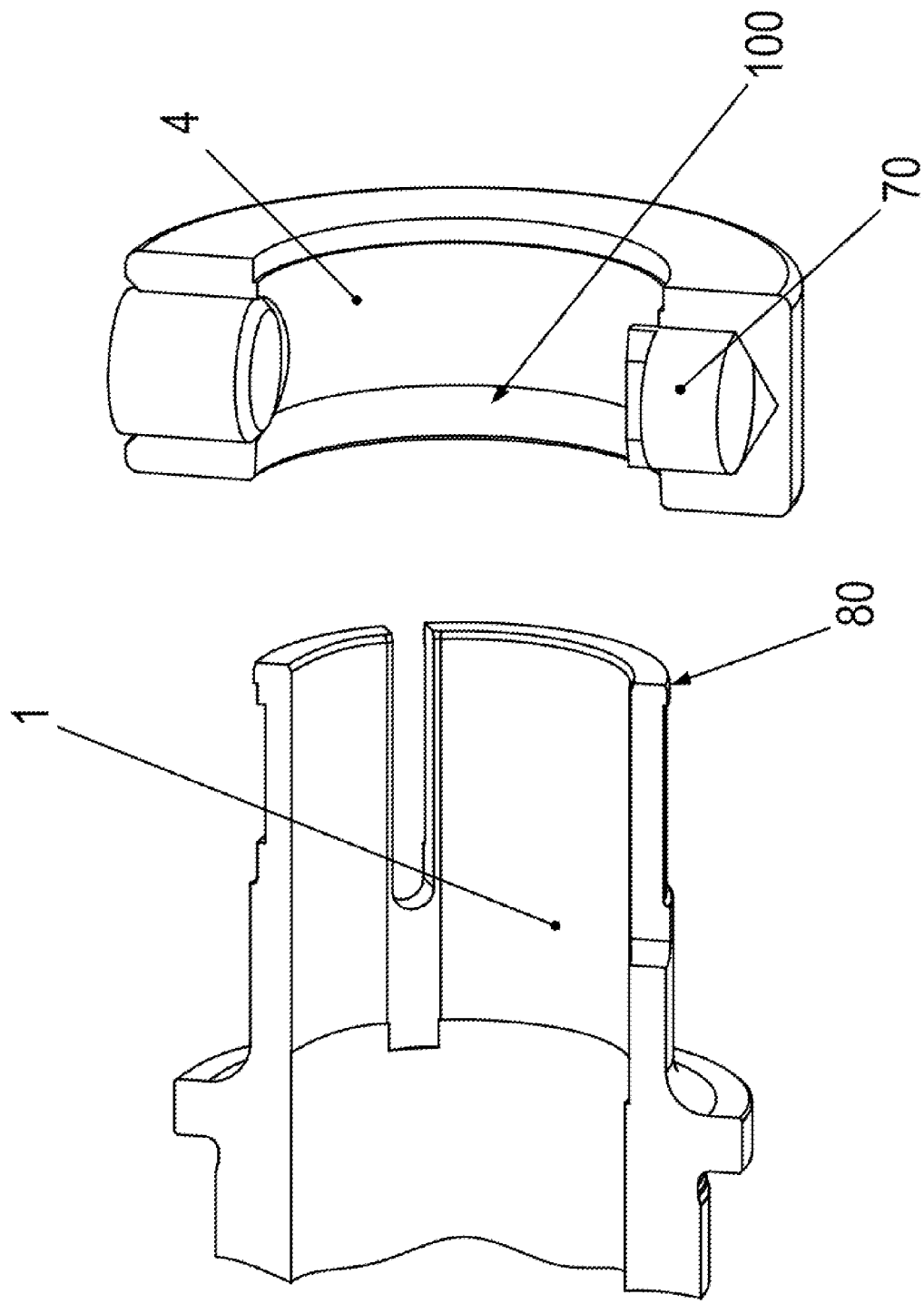
Figure 12:
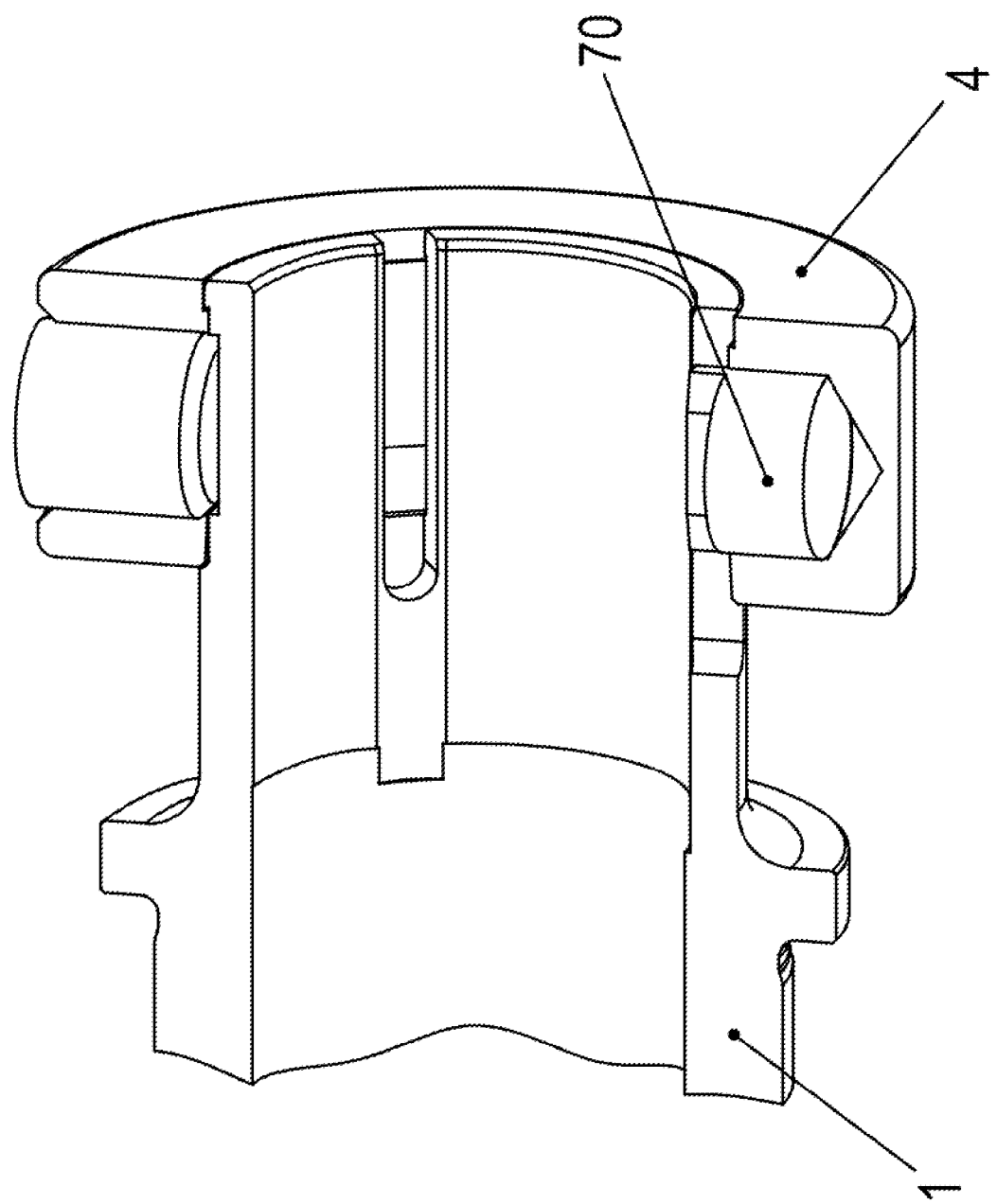
Figure 13:
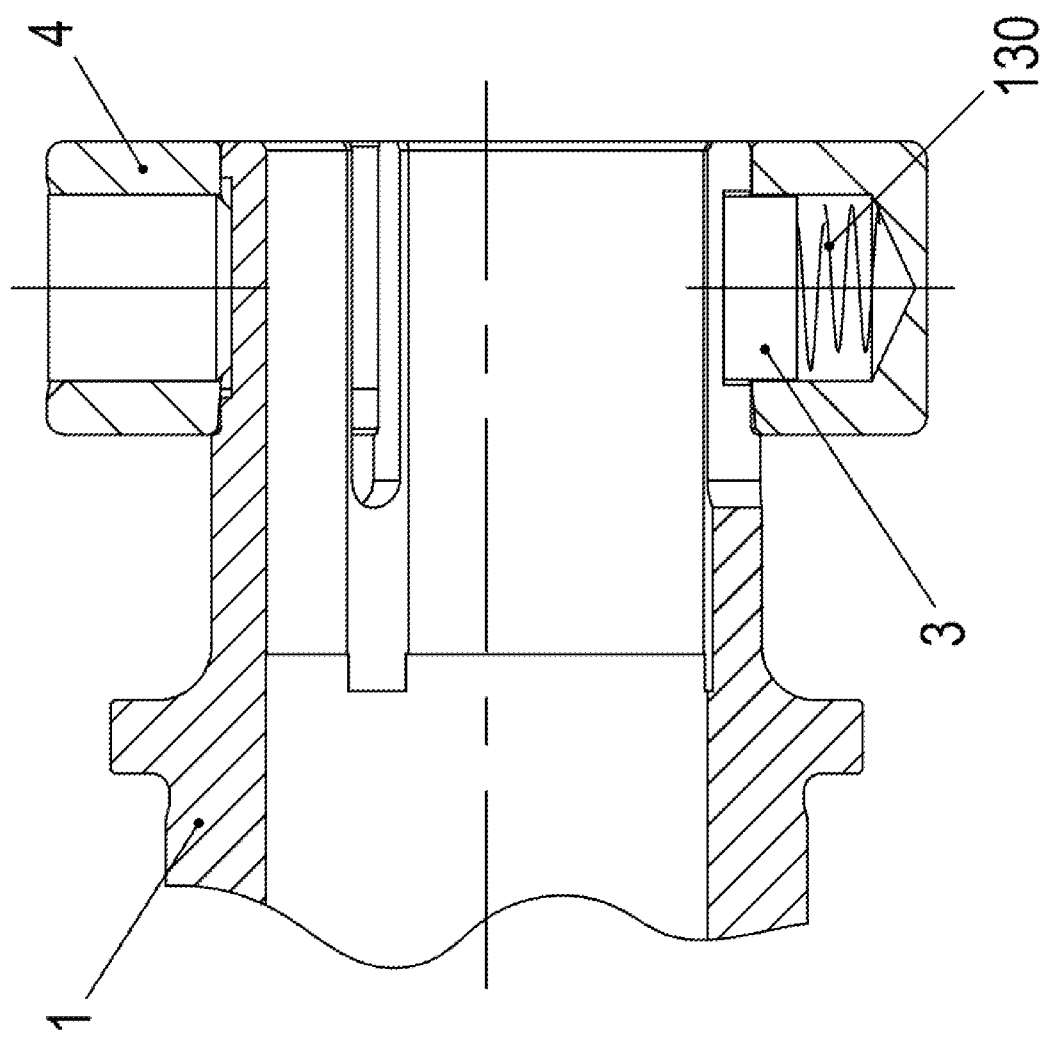
Figure 14:
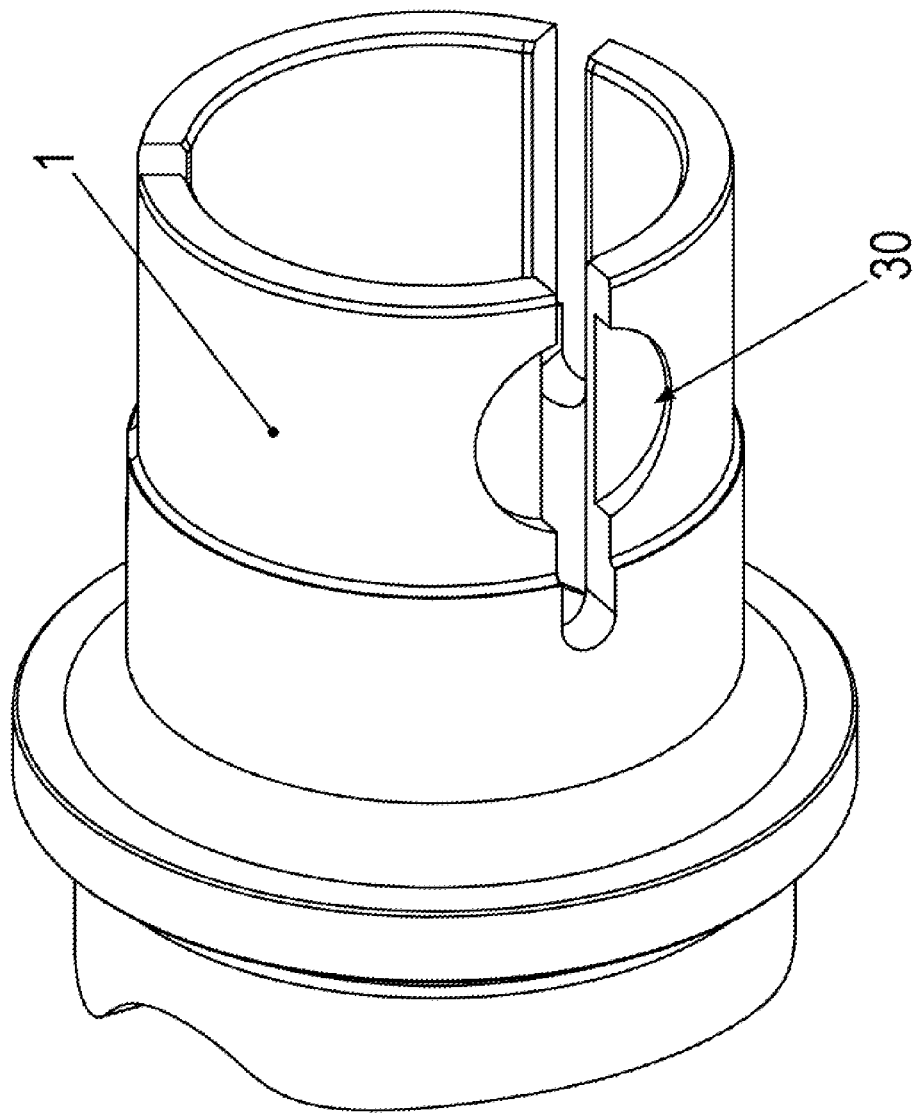
Figure 15:
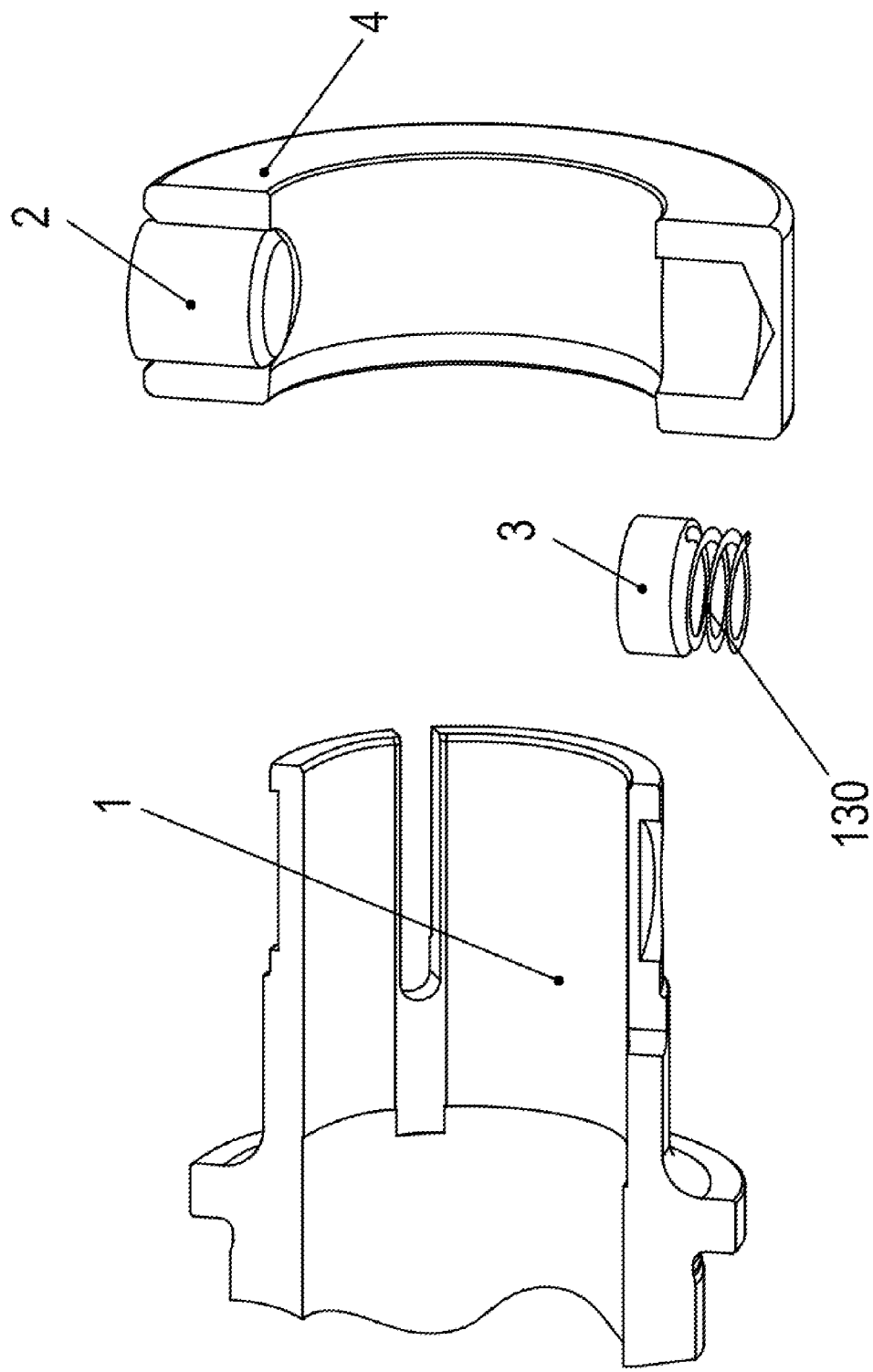
Figure 16:
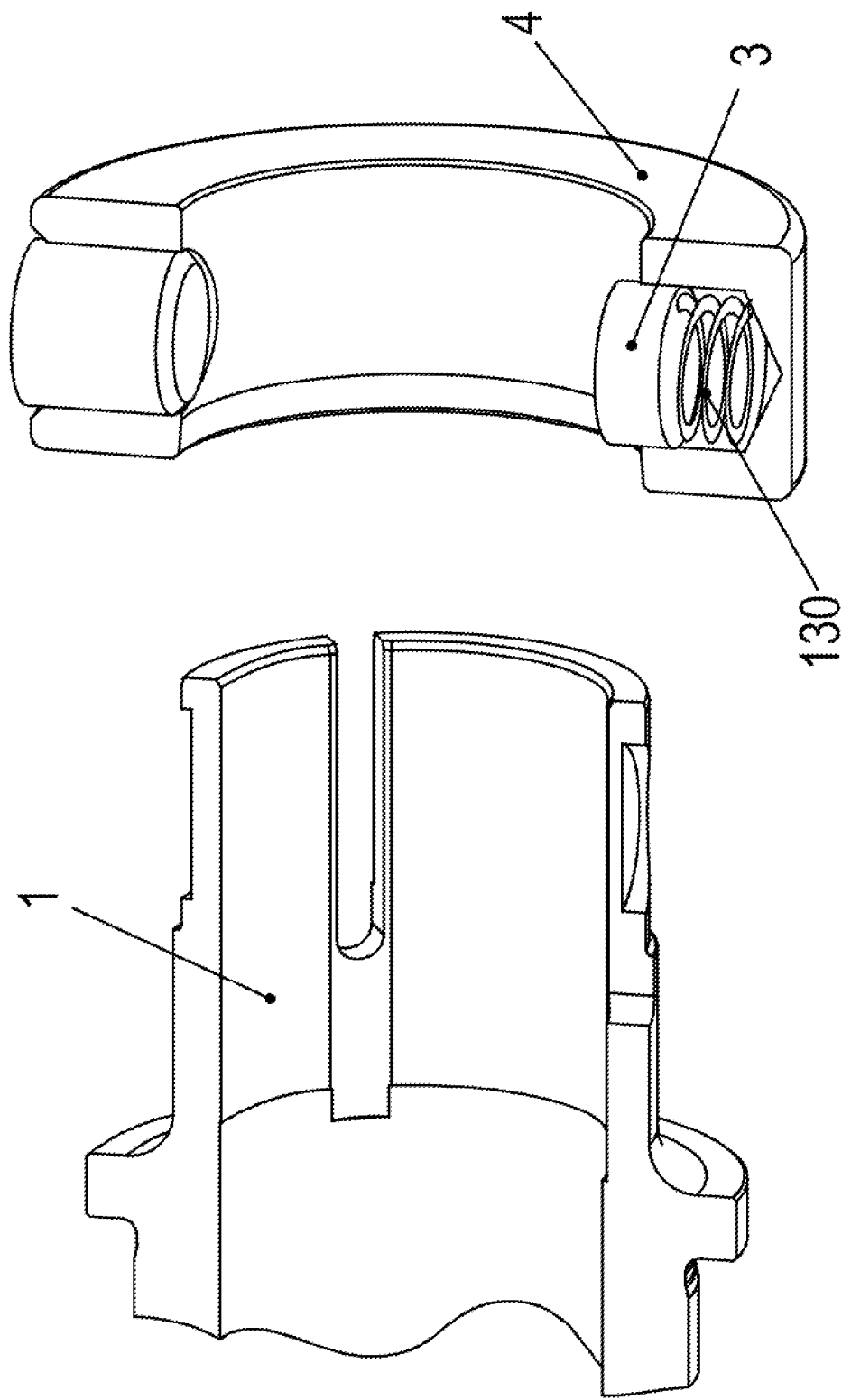
Figure 17:
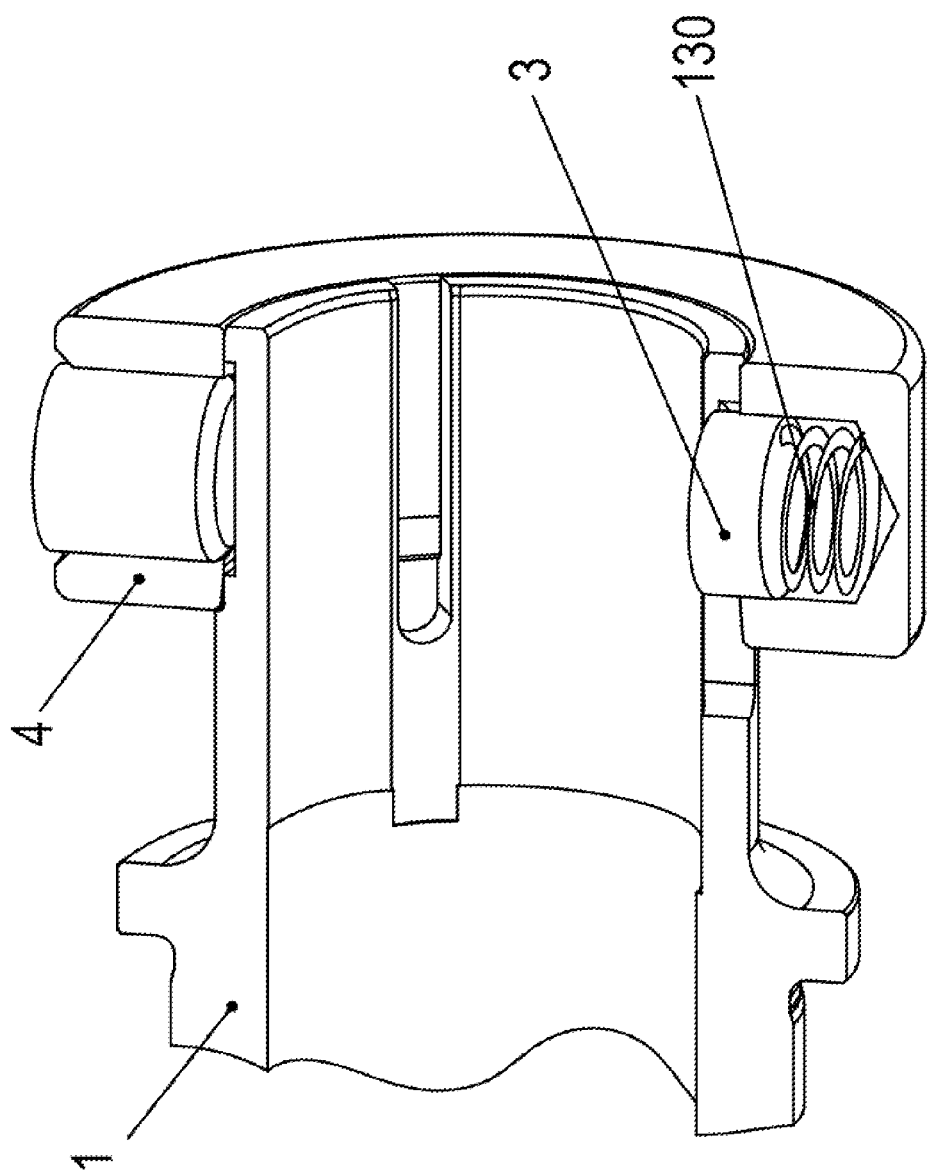

As illustrated in FIG. 5, cylinder bolt 3 is first inserted into the especially radially oriented recess at the inner circumference of clamping ring 4 and clamping ring 4 is then slipped onto adapter shaft 1. A chamfer 41, which acts as a lead-in bevel, then makes it easy to slip adapter shaft 1 onto cylinder bolt 3 accommodated in clamping ring 4. Adapter shaft 1 is elastically deformed, in particular subjected to radial pressure during this insertion process. Because of the axial slots, this elastic deformation is able to be accomplished using little force.

As soon as cylinder bolt 3 has reached the recess having base area 30, it is pushed into the recess against base area 30 by the counter force generated by the elastic deflection. As a result, a region of cylinder bolt 3 then projects into the recess including base area 30 of adapter shaft 1, and another region projects into the recess on the inner wall of clamping ring 4.

Chamfer 41 is disposed in the axial end region of adapter shaft 1, i.e. between the axial end and the recess having base area 30. Chamfer 41 extends only partially in the circumferential direction and in particular covers less than 180° in the circumferential direction. In the remaining region, i.e.

the region not covered by chamfer 41 in the circumferential direction, a radially projecting bead 40 is provided, which, however, need not necessarily extend across the entire remaining circumferential angular range but, for example, only across the particular circumferential angular range that is covered by flattened area 20 in the circumferential direction.

Bead 40 is, for example, formed by introducing flattened area 20 into a cylindrical region, thereby creating bead 40 at the edge.

The region axially covered by bead 40 thus overlaps with the region axially covered by chamfer 41 or encompasses it. As a result, the radial distance region covered by chamfer 41 is smaller than the radial distance region covered by bead 40 or radially abuts it, which, for example, means that it is radially situated within it.

The respective recess thus surrounds cylinder bolt 3 and therefore functions as a protection against loss.

The recess including base area 30 is, for example, arranged as a counter sink in adapter shaft 1.

Adapter shaft 1, threaded pin 2 and cylinder bolt 3 as well as clamping ring 4 therefore form an assembly for a force-fitting connection.

In the upper portion of FIG. 1 it can be seen that clamping ring 4 sits on bead 40, and in the lower part of FIG. 1, i.e. the part situated diametrically opposite, chamfer 41 is visible, which is arranged as a lead-in bevel 40 and is set apart from clamping ring 4. This is so because bead 40 extends farther in the radial direction than chamfer 41. The inner wall of clamping ring 4, on the other hand, is arranged as in the region of a solid of revolution, i.e. it has a radial distance that is constant in every axial position, i.e. a radial distance that is independent of the circumferential position.

Thus, the arrangement described herein allows for a clamping connection, in particular a shrink disk connection, between an adapter shaft and a shaft, in particular a solid shaft.

Bead 40 thus provides an additional, form-fitting restriction of threaded pin 2 in the axial direction.

LIST OF REFERENCE NUMERALS 1 adapter shaft, in particular hollow shaft region
2 threaded pin
3 cylinder bolt
4 clamping ring
20 flattened area
30 base area
40 bead
41 chamfer

The invention claimed is:

1. An assembly for connecting an adapter shaft to a shaft in a force-fitting manner, comprising:
   a clamping ring adapted to be mounted on the adapter shaft, the shaft being insertable into the adapter shaft, the clamping ring including a radially uninterrupted threaded bore into which a screw part is screwed, the screw part adapted to exert pressure on the adapter shaft; and
   a circular cylindrical disk accommodated in a first recess of the clamping ring, the disk adapted to project radially inwardly into a second recess of the adapter shaft to form a protection against loss and an anti-rotation protection acting in an axial direction and in a circumferential direction;
   wherein the first and second recesses are arranged as blind recesses.

2. The assembly according to claim 1, wherein the screw part includes a threaded pin.

3. The assembly according to claim 1, wherein the screw part is adapted to exert pressure on a flattened area of the adapter shaft.

4. The assembly according to claim 1, wherein the adapter shaft includes axial slots, axial slots that are set apart from one another in the circumferential direction, and/or axial slots that are set apart from one another at regular intervals in the circumferential direction.

5. The assembly according to claim 4, wherein the second recess overlaps with one of the axial slots.

6. The assembly according to claim 5, wherein a region axially covered by the second recess overlaps with a region axially covered by the axial slot and/or a region covered by the second recess in the circumferential direction overlaps with the region covered by the axial slot in the circumferential direction.

7. The assembly according to claim 4, wherein the axial slots at an axial end of the adapter shaft lead into ambient air.

8. The assembly according to claim 1, wherein the shaft is insertable into a region of the adapter shaft that is arranged as a hollow shaft region.

9. The assembly according to claim 8, wherein the shaft is arrangeable coaxially with the adapter shaft.

10. The assembly according to claim 1, wherein the first recess and the bore are arranged diametrically opposite each other.

11. The assembly according to claim 10, wherein centers of gravity and/or center points of the first recess and the bore have a distance of 180° in the circumferential direction.

12. The assembly according to claim 1, wherein the adapter shaft includes a chamfer and/or a lead-in bevel in an axial end region and between the second recess and the axial end of the adapter shaft that leads to the second recess when the clamping ring is mounted on the circular cylindrical disk.

13. The assembly according to claim 1, wherein, in an axial region between a region axially covered by the second recess and an axial end of the adapter shaft, the adapter shaft has a radially smaller extension in a region covered by the second recess in the circumferential direction than in a diametrically opposite region, in any other diametrically opposite region, and/or in the circumferential direction.

14. The assembly according to claim 1, wherein a maximum radial distance of the adapter shaft in an axial region between a region axially covered by the second recess and an axial end of the adapter shaft increases from a region covered by the second recess in the circumferential direction to a region covered by the first recess in the circumferential direction.

15. The assembly according to claim 1, wherein the first recess is rectangular and/or is tangentially aligned, and/or the second recess is rectangular and/or includes a circular blind bore that does not extend through the adapter shaft.

16. The assembly according to claim 1, wherein the adapter shaft includes a chamfer and/or a lead-in bevel that covers a circumferential angular range in the circumferential direction that includes a circumferential angular range covered by the second recess, and, set apart from the chamfer and/or bevel in the circumferential direction, a bead is provided on the adapter shaft that covers an axial region that includes an axial region covered by the chamfer and/or bevel.

17. The assembly according to claim 16, wherein the region covered by the bead in the circumferential direction includes a region covered by a flattened area, of the adapter shaft, in the circumferential direction.

18. The assembly according to claim 16, wherein a radial distance region covered by the chamfer and/or bevel is located radially within a radial distance region covered by the bead and/or radially adjoins it in the radially inward direction.

19. The assembly according to claim 1, wherein a characteristic of a maximum radial distance of the adapter shaft in the axial direction has a local minimum in the axial region covered by the second recess.

20. The assembly according to claim 1, wherein a region axially covered by the first recess overlaps with a region axially covered by the second recess.

21. The assembly according to claim 1, wherein a region covered by the first recess in the circumferential direction overlaps with a region covered by the second recess in the circumferential direction.

22. An assembly for connecting an adapter shaft to a shaft in a force-fitting manner, comprising:
 a clamping ring adapted to be mounted on the adapter shaft, the shaft being insertable into the adapter shaft, the clamping ring including a radially uninterrupted threaded bore into which a screw part is screwed, the screw part adapted to exert pressure on the adapter shaft; and
 a circular cylindrical disk accommodated in a first recess of the clamping ring, the circular cylindrical disk adapted to project radially inwardly into a second recess of the adapter shaft to form a protection against loss and an anti-rotation protection acting in an axial direction and in a circumferential direction.

23. A device, comprising:
 an adapter shaft;
 a shaft; and
 an assembly adapted to connect the adapter shaft to the shaft in a force-fitting manner, the assembly including:
  a clamping ring mounted on the adapter shaft, the shaft being inserted into the adapter shaft, the clamping ring including a radially uninterrupted threaded bore into which a screw part is screwed, the screw part exerting pressure on the adapter shaft; and
  a circular cylindrical disk accommodated in a first recess of the clamping ring, the disk projecting radially inwardly into a second recess of the adapter shaft to form a protection against loss and an anti-rotation protection acting in an axial direction and in a circumferential direction.

24. The device according to claim 23, wherein the first and second recesses are arranged as blind recesses.

* * * * *